March 21, 1939.  E. J. VON HENKE  2,151,342
WELDING APPARATUS
Filed June 3, 1936
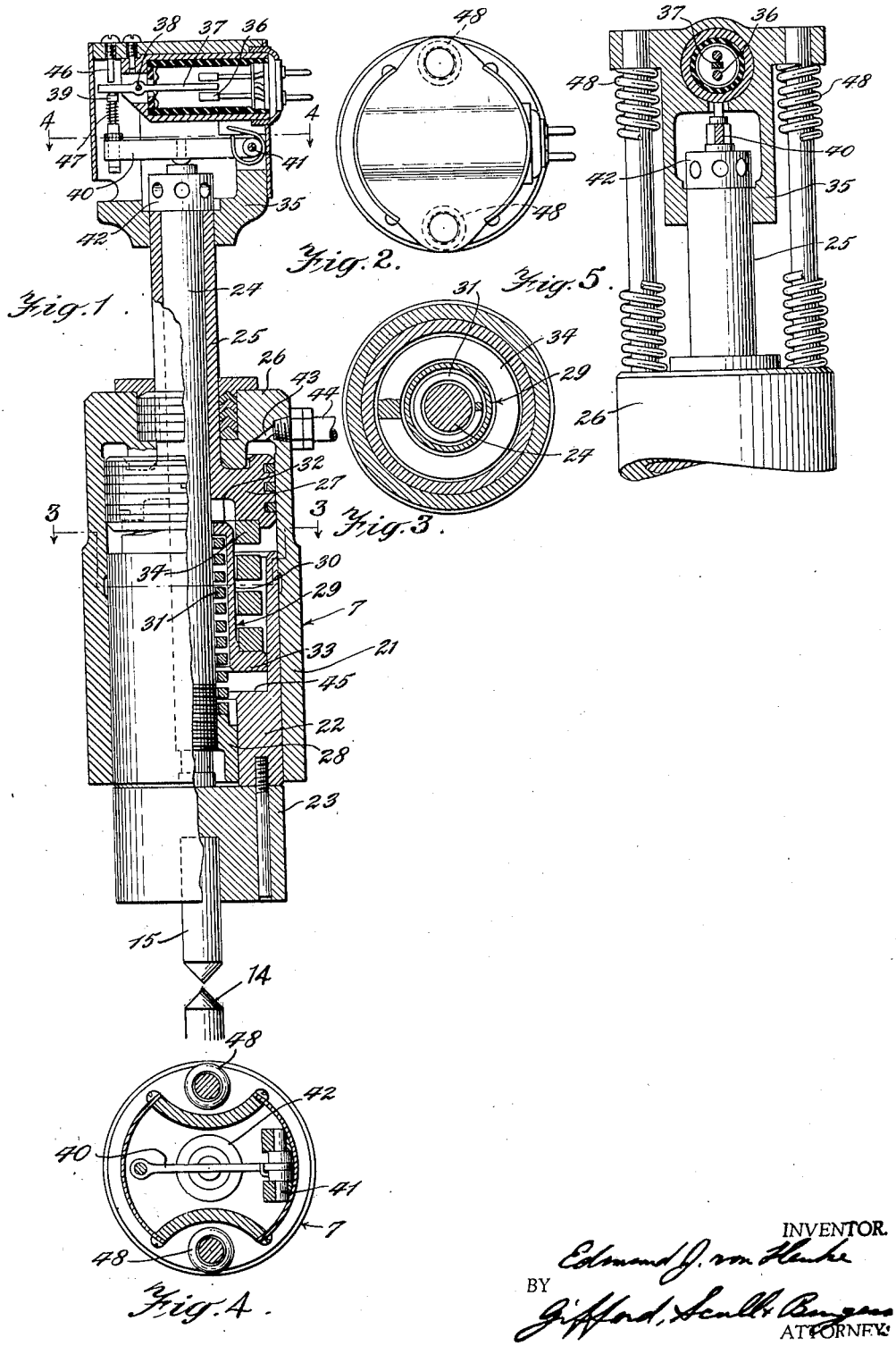
INVENTOR.
Edmund J. von Henke
BY
Gifford, Scull & Burgess
ATTORNEYS Patented Mar. 21, 1939

2,151,342

UNITED STATES PATENT OFFICE 2,151,342

WELDING APPARATUS

Edmund J. von Henke, Chicago, Ill., assignor to American Electric Fusion Corporation, Chicago, Ill., a corporation of Illinois Application June 3, 1936, Serial No. 83,177

6 Claims. (Cl. 219—4)

This invention relates to a novel and improved form of welding gun, more particularly one adapted to be operated by hydraulic means, and the invention will be best understood from the following description and the annexed drawing, in which I have shown a selected embodiment of the invention and in which:

Fig. 1 is a vertical view, partly in elevation and partly in section, through a welding gun constructed according to the invention;

Fig. 2 is a top plan view of the structure appearing in Fig. 1;

Fig. 3 is a section approximately on the line 3—3 of Fig. 1;

Fig. 4 is a section approximately on the line 4—4 of Fig. 1;

Fig. 5 is a view, partly in elevation and partly in section, showing the upper part of the structure appearing in Fig. 1 as viewed at right angles to the plane of Fig. 1.

The gun illustrated herein may be actuated by hydraulic pressure from any suitable source and that pressure is transmitted to an electrode in such a way as to press that electrode against the work to be welded. In the illustrated embodiment, the gun is designated generally by the numeral 7, and the electrode operated thereby is designated by the numeral 15. It will be seen that the gun comprises an outer casing or cylinder 21 in which is slidably mounted a sleeve 22, to the lower end of which is secured an electrode head 23 carrying the electrode 15. Integrally connected to the head 23 is a stem 24 extending through a piston 25, which in turn extends through the head 26 of the cylinder and has a piston head 27 slidably mounted in the cylinder. Threaded on the stem 24 is a fixed collar 28 which thus moves as part of the electrode head. The sleeve 22 may also be considered as part of this head, since it moves therewith. Slidably mounted on the stem is a loose collar 29 having a body 30 spaced from the stem to enclose a relatively light spring 31 between it and the stem and having at its opposite ends shoulders 32 and 33 to engage springs 31 and 34, respectively. It will be noted that the spring 34 is relatively much heavier than the spring 31, and that the spring 34 is compressed between the shoulder 33 and the piston head 27, whereas the spring 31 is compressed between the fixed collar 28 and the shoulder 32.

Secured to the piston 25 is a housing 35 enclosing an electrical switch, which is of the form commonly known as a vacuum switch, having two fixed contacts, only one of which, 36, is used in this particular apparatus. The switch also comprises a pivoted contact 37 which is pivoted at 38 and which has a projecting end contacting a plunger 39 resiliently mounted on a lever 40 pivoted at 41 in the housing. The top of the stem 24 is provided with a capstan nut 42, by means of which the stem may be adjusted in the tubular piston 25, this nut engaging the end of the piston, as plainly shown.

In operation, fluid to operate the piston is admitted through the port 43 from a tube 44, and the piston is forced down by this fluid. Since the spring 34 is so much heavier than the spring 31, the first action will be to compress the spring 31 to the limit of its compression, at which time the shoulder 33 will contact with the shoulder 45 on the sleeve 22. Continued downward movement of the piston will now cause compression of the heavy spring 34 acting directly against the sleeve 22 and the welding head 23. Initial compression of the spring 31 will have caused the electrode 15 to contact with the work, and then the continued action of the spring 34 will apply the necessary welding pressure to the electrode. Since the electrode 15 is in contact with the work, compression of the spring 34 will move the housing 35 down away from the capstan nut 42. In other words, the stem 24 will remain stationary while the piston 25 moves downwardly. The result will be a movement of the lever 40 on its pivot and a closing of the switch between the contacts 36 and 37, thus supplying the welding current. A stop 46 is provided to limit the upward movement of the plunger 39, it being understood that this plunger is mounted for vertical movement in the lever 40 against the action of a light spring 47.

When the switch is closed as just described above, the welding current may be applied to the electrode 15 and its companion electrode 14 by any suitable connections, the details of which are not necessary to an understanding of the invention and therefore have been omitted. It is of course to be understood that the work to be welded is disposed between the two electrodes and it has been assumed that such work will be supported by the electrode 14.

The tube 44 is used as an inlet and also as an outlet for fluid, and the passage of fluid through the tube 44 may be controlled by any suitable valve mechanism which will cause fluid to flow through the tube to the port 43 and then will permit it to flow out of the port 43 into the tube 44. The details of that valve mechanism are not necessary to an understanding of the invention and therefore they will not be described further. It will suffice to say that such a valve may be operated to first cause fluid to flow into the cylinder above the piston head 27 and thus compress the springs 31 and 34 as just described above. Then the valve mechanism may be operated again to release the pressure on the fluid in the tube 44 and in the cylinder and then the springs 31 and 34 will serve to return the cylinder head to the approximate position shown in Fig. 1.

While I have shown the invention as embodied in a specific form, it is to be understood that various changes in details may be made without departing from the scope of the invention, as defined by the appended claims.

I claim:

1. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a collar in the cylinder between the piston head and the electrode head and loose therefrom, a relatively light compression spring between said collar and said electrode head, and a relatively heavy compression spring between said collar and said piston head.

2. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a collar in the cylinder between the piston head and the electrode head and loose therefrom, a relatively light compression spring between said collar and said electrode head, a relatively heavy compression spring between said collar and said piston head, and formations on the collar and electrode head adapted to engage each other after compression of said light spring.

3. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a relatively light and a relatively heavy compression spring disposed between said piston and said electrode head and both compressed by movement of the piston towards the head, one spring bearing against the piston and the other spring bearing against the head and the two springs bearing against each other.

4. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a relatively light and a relatively heavy compression spring disposed between said piston and said electrode head and both compressed by movement of the piston towards the head, one spring bearing against the piston and the other spring bearing against the head and the two springs bearing against each other, and means limiting the amount of compression of said light spring and causing the force of the heavy spring to be transmitted directly to the head from the piston.

5. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a relatively light and a relatively heavy compression spring disposed between said piston and said electrode head and both compressed by movement of the piston towards the head, the heavy spring bearing against the piston and the light spring bearing against the head and the two springs bearing against each other.

6. A welding gun comprising a cylinder, a welding electrode beyond one end of the cylinder, an electrode head supporting said electrode and slidable in said cylinder adjacent said end thereof, a piston head slidable in said cylinder and normally disposed adjacent the other end of the cylinder, means for forcing said piston towards said electrode head, a relatively light and a relatively heavy compression spring disposed between said piston and said electrode head and both compressed by movement of the piston towards the head, the heavy spring bearing against the piston and the light spring bearing against the head and the two springs bearing against each other, and means limiting the amount of compression of said light spring and causing the force of the heavy spring to be transmitted directly to the head from the piston.

EDMUND J. von HENKE.